US010030577B2

(12) United States Patent
Kai et al.

(10) Patent No.: US 10,030,577 B2
(45) Date of Patent: *Jul. 24, 2018

(54) VEHICLE

(71) Applicant: YAMAHA HATSUDOKI KABUSHIKI KAISHA, Iwata-shi, Shizuoka (JP)

(72) Inventors: Manabu Kai, Shizuoka (JP); Akihiko Nakamura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 145 days.

This patent is subject to a terminal disclaimer.

(21) Appl. No.: 14/841,757

(22) Filed: Sep. 1, 2015

(65) Prior Publication Data
US 2016/0090905 A1  Mar. 31, 2016

(30) Foreign Application Priority Data
Sep. 26, 2014  (JP) .................. 2014-197455

(51) Int. Cl.
*F02B 39/04* (2006.01)
*F02B 39/12* (2006.01)
(Continued)

(52) U.S. Cl.
CPC .............. *F02B 39/04* (2013.01); *B60K 5/04* (2013.01); *B62M 9/06* (2013.01); *B62M 27/02* (2013.01);
(Continued)

(58) Field of Classification Search
CPC .......... F02B 39/04; F02B 39/06; F02B 39/12; F02B 61/00; F02B 61/02; F02B 61/04; F02B 61/045; F02B 61/06; F02B 33/28; F02B 33/40; B60K 5/04; B62M 9/06; B62M 9/04; B62M 2027/021; B62M 2027/022; B62M 2027/023;
(Continued)

(56) References Cited

U.S. PATENT DOCUMENTS 2,038,038 A    4/1936  Gregg
3,595,013 A *  7/1971  Brille ............... F02B 27/04
                                                 123/561
(Continued)

FOREIGN PATENT DOCUMENTS

FR    2689568 A1 *  10/1993  .............. F02B 33/44

OTHER PUBLICATIONS

Underdrive Pulleys—Wikipedia Mar. 1 2011.*

*Primary Examiner* — Jason Shanske
*Assistant Examiner* — Jessica Kebea
(74) *Attorney, Agent, or Firm* — Keating and Bennett, LLP

(57) ABSTRACT

A vehicle includes a transmission including an input shaft linked to a crankshaft of an engine so that power is transmitted therebetween, and an output shaft which is able to rotate at a rotational speed lower than a rotational speed of the input shaft. The snowmobile includes a driving device linked to the output shaft so that power is transmitted therebetween to generate a driving power, a supercharger including a rotation shaft linked to the output shaft so that power is transmitted therebetween, and a centrifugal clutch located between the crankshaft and the input shaft or between the output shaft and the rotation shaft.

11 Claims, 10 Drawing Sheets

(51) Int. Cl.
  *F02B 33/40* (2006.01)
  *F02B 61/00* (2006.01)
  *B60K 5/04* (2006.01)
  *B62M 9/06* (2006.01)
  *B62M 27/02* (2006.01)

(52) U.S. Cl.
  CPC .............. *F02B 33/40* (2013.01); *F02B 39/12* (2013.01); *F02B 61/00* (2013.01); *B60Y 2200/252* (2013.01); *B62M 2027/023* (2013.01)

(58) Field of Classification Search
  CPC ...... B62M 2027/025; B62M 2027/026; B62M 2027/027; B62M 2027/028; B26M 27/00; B26M 27/02; B60Y 2200/12; B60Y 2200/122; B60Y 2200/124; B60Y 2200/126; B60Y 2200/20; B60Y 2200/252
  See application file for complete search history.

(56) References Cited

U.S. PATENT DOCUMENTS

| | | | | |
|---|---|---|---|---|
| 5,050,701 A * | 9/1991 | Okui | ................. | B60K 5/04 123/184.42 |
| 5,058,558 A * | 10/1991 | Ueda | ................. | F02B 67/06 123/559.1 |
| 5,066,266 A * | 11/1991 | Kobayashi | ............. | B60K 17/06 180/297 |
| 5,117,799 A * | 6/1992 | Suzuki | ................. | F02B 39/04 123/561 |
| 5,427,079 A * | 6/1995 | Andrepont, Jr. | .......... | F01N 3/20 123/561 |
| 5,890,468 A * | 4/1999 | Ozawa | ................. | F02B 37/005 123/561 |
| 6,182,784 B1 * | 2/2001 | Pestotnik | ................. | B60K 5/06 180/337 |
| 7,198,127 B2 | 4/2007 | Yatagai et al. | | |
| 8,397,501 B2 * | 3/2013 | Barker | ................. | F02B 33/34 123/559.1 |
| 8,439,020 B1 * | 5/2013 | Carlson | ................. | F02B 33/40 123/559.1 |
| 8,668,040 B2 * | 3/2014 | Karube | ................. | B60K 5/00 123/198 E |
| 9,488,095 B2 * | 11/2016 | Venton-Walters | ...... | F02B 33/44 |
| 9,568,023 B2 * | 2/2017 | Naruoka | ................. | F02B 39/04 |
| 9,592,725 B2 * | 3/2017 | Tiry | ................. | B60K 5/04 |
| 2007/0102215 A1 | 5/2007 | Pichler et al. | | |
| 2013/0172138 A1 * | 7/2013 | Sega | ................. | B60K 25/02 474/148 |
| 2015/0183421 A1 * | 7/2015 | Baliff | ................. | B60W 10/06 701/22 |
| 2016/0001649 A1 * | 1/2016 | Benjey | ................. | B60K 6/48 477/5 |

\* cited by examiner

VEHICLE

The present application claims priority to Japanese Patent Application No. 2014-197455, filed on Sep. 26, 2014, the disclosure of which is hereby incorporated by reference in its entirety.

BACKGROUND OF THE INVENTION

1. Field of the Invention

The present invention relates to a vehicle including a supercharger.

2. Description of the Related Art

A supercharger has been used in order to improve the engine power in vehicles such as snowmobiles and four-wheel buggies. U.S. Pat. No. 7,198,127 discloses a snowmobile including a turbo-type supercharger that utilizes the energy of the exhaust gas from the internal combustion engine. U.S. Patent Application Publication No. 2007/0102215 discloses a snowmobile including a mechanical supercharger that is driven by the crankshaft of the internal combustion engine.

A turbo-type supercharger utilizes the energy of the exhaust gas, and when it is used in an off-road vehicle such as a snowmobile or a four-wheel buggy, the responsiveness is poor in the low- to mid-speed range where the energy of the exhaust gas is small. That is, in the low- to mid-speed range, the effect of the turbo-type supercharger for enhancing the engine power does not respond well to the throttle control. Moreover, the use of hot exhaust gas necessitates an advanced thermal management in the turbo-type supercharger and the engine room.

With a supercharger that is driven by the crankshaft, a vehicle that is normally used at a high engine speed, such as a snowmobile, will have an unnecessarily high supercharging pressure at a low speed. The need to control the supercharging pressure so that the supercharging pressure will not be too high leads to a complicated structure. An off-road vehicle such as a snowmobile or a four-wheel buggy is sometimes used under harsh environments such as subfreezing temperatures. When using a supercharger that is driven by the crankshaft, the load on the crankshaft is increased by the power used to drive the supercharger. Therefore, when starting the engine with a starter motor, it is necessary to provide a large power to the crankshaft, and it is thus necessary to provide a larger starter motor.

SUMMARY OF THE INVENTION

Preferred embodiments of the present invention have been made in view of the problems set forth above, and provide a vehicle that improves the engine power, keeps the load on the crankshaft at start-up low, and achieves desirable supercharging pressure characteristics.

A vehicle according to a preferred embodiment of the present invention includes an internal combustion engine including a crankshaft, a transmission, a driving device, a supercharger, and a centrifugal clutch. The transmission includes an input shaft linked to the crankshaft so that power is transmitted therebetween, and an output shaft which is linked to the input shaft and is able to rotate at a rotational speed lower than a rotational speed of the input shaft. The driving device is linked to the output shaft so that power is transmitted therebetween and is configured to generate a driving power. The supercharger includes a rotation shaft linked to the output shaft so that power is transmitted therebetween and is configured to compress air and supply compressed air to the internal combustion engine. The centrifugal clutch is located between the crankshaft and the input shaft or between the output shaft and the rotation shaft.

The vehicle according to the preferred embodiment described above preferably includes a supercharger, and it is therefore possible to improve the engine power. The supercharger includes the rotation shaft linked to the output shaft so that power is transmitted therebetween, and is driven by the power from the output shaft. Therefore, unlike a turbo-type supercharger that utilizes the exhaust gas, the responsiveness is not lowered in the low- to mid-speed range, and there is no need for advanced thermal management. Moreover, in the vehicle described above, the centrifugal clutch is located between the crankshaft and the input shaft or between the output shaft and the rotation shaft. That is, the centrifugal clutch is located upstream of the rotation shaft of the supercharger along the power transmission path. Therefore, when the rotational speed of the crankshaft is zero or low, the power transmission between the crankshaft and the rotation shaft of the supercharger is disconnected, thus reducing the load on the crankshaft. Therefore, the engine is desirably started by the starter motor without having to provide a large starter motor. Moreover, the supercharging pressure does not become unnecessarily high at a low speed thus achieving desirable supercharging pressure characteristics. As described above, with the vehicle described above, it is possible to improve the engine power, to keep the load on the crankshaft at start-up low, and to achieve desirable supercharging pressure characteristics.

According to a preferred embodiment of the present invention, the transmission is preferably a belt-type continuously variable transmission including a driving pulley attached to the input shaft, a driven pulley attached to the output shaft, and a belt wound around the driving pulley and the driven pulley.

According to this preferred embodiment, the transmission is able to continuously vary the transmission ratio. While the supercharger is driven by the output shaft, the rotational speed of the output shaft changes smoothly during a speed change. This prevents the operation of the supercharger from becoming unstable, thus achieving more desirable supercharging pressure characteristics.

According to another preferred embodiment of the present invention, the transmission is located on a side of the internal combustion engine. The supercharger is located on an opposite side of the internal combustion engine from the transmission.

According to this preferred embodiment, the vehicle has a desirable weight balance.

According to another preferred embodiment of the present invention, the crankshaft extends in a vehicle width direction. The transmission is located on a first side of the internal combustion engine in the vehicle width direction. The supercharger is located on a second side, opposite to the first side, of the internal combustion engine in the vehicle width direction.

According to this preferred embodiment, the vehicle has a desirable weight balance in the vehicle width direction.

According to another preferred embodiment of the present invention, the output shaft extends from the first side toward the second side of the internal combustion engine in the vehicle width direction.

According to this preferred embodiment, on the second side of the internal combustion engine in the vehicle width direction, the output shaft and the rotation shaft of the supercharger are linked together so that power is transmitted therebetween. Thus, it is possible to simplify the configuration of the power transmission member that links together the output shaft and the rotation shaft of the supercharger.

According to another preferred embodiment of the present invention, the supercharger includes a suction port that takes in air and includes an opening facing the first side in the vehicle width direction.

According to this preferred embodiment, since the suction port of the supercharger includes an opening facing toward the first side in the vehicle width direction, it is possible to provide extra space on the second side of the supercharger in the vehicle width direction. This extra space is effectively utilized as a space to install other components. For example, the extra space is effectively utilized as a space to install the power transmission member that links together the output shaft and the rotation shaft of the supercharger.

According to another preferred embodiment of the present invention, the vehicle includes a duct including an inlet located on the first side of the internal combustion engine in the vehicle width direction, and an outlet connected to the suction port of the supercharger, wherein the duct extends from the first side toward the second side in the vehicle width direction.

According to this preferred embodiment, air is taken in from the first side in the vehicle width direction.

According to another preferred embodiment of the present invention, the rotation shaft of the supercharger is linked to the output shaft via at least one of a belt, a chain, and a gear.

According to this preferred embodiment, the power from the output shaft is desirably transmitted to the rotation shaft of the supercharger.

According to another preferred embodiment of the present invention, the output shaft includes a driving device link portion linked to the driving device, and a supercharger link portion linked to the rotation shaft of the supercharger.

According to this preferred embodiment, since the supercharger is not located downstream of the driving device, along the power transmission path, the supercharger operates without being substantially influenced by the operation of the driving device. Thus, it is possible to desirably operate the supercharger.

According to another preferred embodiment of the present invention, the driving device link portion is located between the supercharger link portion along the output shaft and the transmission.

According to this preferred embodiment, the supercharger link portion is located on the outer side of the driving device link portion along the output shaft. Thus, a common internal combustion engine is able to be used both for vehicles including a supercharger and for vehicles including no supercharger.

According to another preferred embodiment of the present invention, the driving device includes a switching device to switch between a forward moving mode in which a forward driving power is generated and a backward moving mode in which a backward driving power is generated.

According to this preferred embodiment, the vehicle is moved forward and backward through the switching of the switching device. Since the supercharger is not located downstream of the driving device, as described above, the direction of rotation of the rotation shaft is not reversed upon switching of the switching device. Thus, the supercharger is desirably operated whether the vehicle is moving forward or backward.

According to another preferred embodiment of the present invention, the vehicle is a snowmobile.

According to this preferred embodiment, it is possible to provide a snowmobile with the advantageous effects set forth above.

According to another preferred embodiment of the present invention, the vehicle is an off-road vehicle.

According to this preferred embodiment, it is possible to provide an off-road vehicle with the advantageous effects set forth above.

According to the preferred embodiments of the present invention, it is possible to provide a vehicle, with which it is possible to improve the engine power, to keep the load on the crankshaft at start-up low, and to achieve desirable supercharging pressure characteristics.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
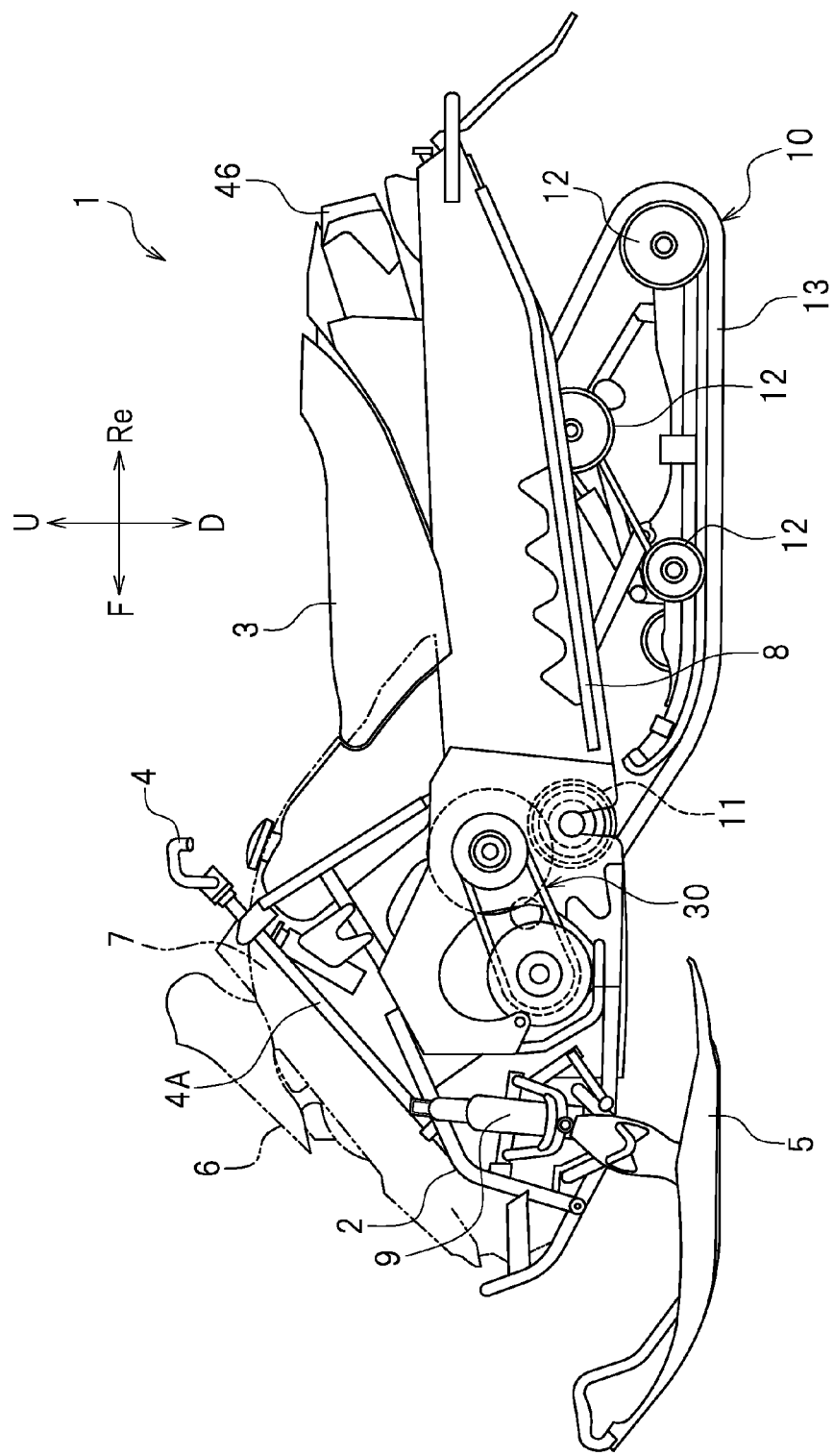
FIG. 1 is a left side view showing a snowmobile according to a preferred embodiment of the present invention.

Preferred embodiments of the present invention will now be described. As shown in FIG. 1, a vehicle of the present embodiment is a snowmobile 1. The terms front, rear, left, right, up, and down, as used in the description below, refer to these directions as seen from a passenger seated in a seat 3 of the snowmobile 1, unless specified otherwise. The designations F, Re, L, R, U, and D, as used in the figures, refer to front, rear, left, right, up, and down, respectively.

The snowmobile 1 includes a frame 2, the seat 3 supported on the frame 2 in which a passenger is seated, a handle 4 operated by the passenger, and a pair of left and right skis 5. A steering shaft 4A is connected to the handle 4. Although not shown in the figures, the steering shaft 4A is linked to the left and right skis 5. A front cover 6 is provided forward of the seat 3. A left side cover 7 is located leftward of the front cover 6, and a right side cover (not shown) is located rightward of the front cover 6. A left footrest 8 is provided on the lower left side of the seat 3, and a right footrest (not shown) is provided on the lower right side of the seat 3. The left and right skis 5 are supported on the frame 2 via left and right suspension units 9. The snowmobile 1 is an example of a straddle-type vehicle, and is configured to be ridden by a passenger straddling the seat 3. Note, however, that the vehicle of the present invention may be a straddle-type vehicle other than the snowmobile 1, and may be a vehicle other than a straddle-type vehicle.

Figure 2:
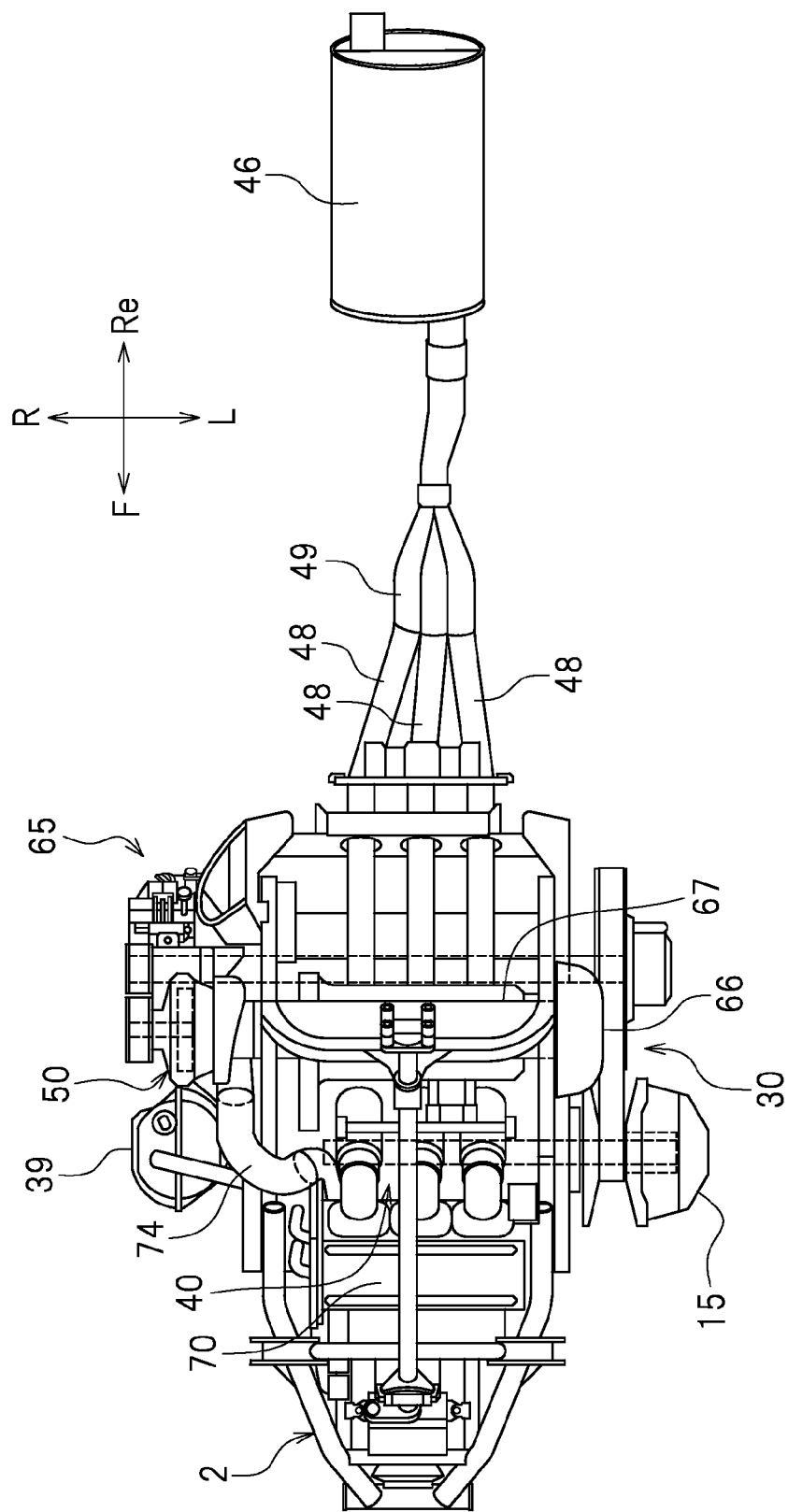
FIG. 2 is a plan view showing a primary section of the snowmobile.
Figure 3:
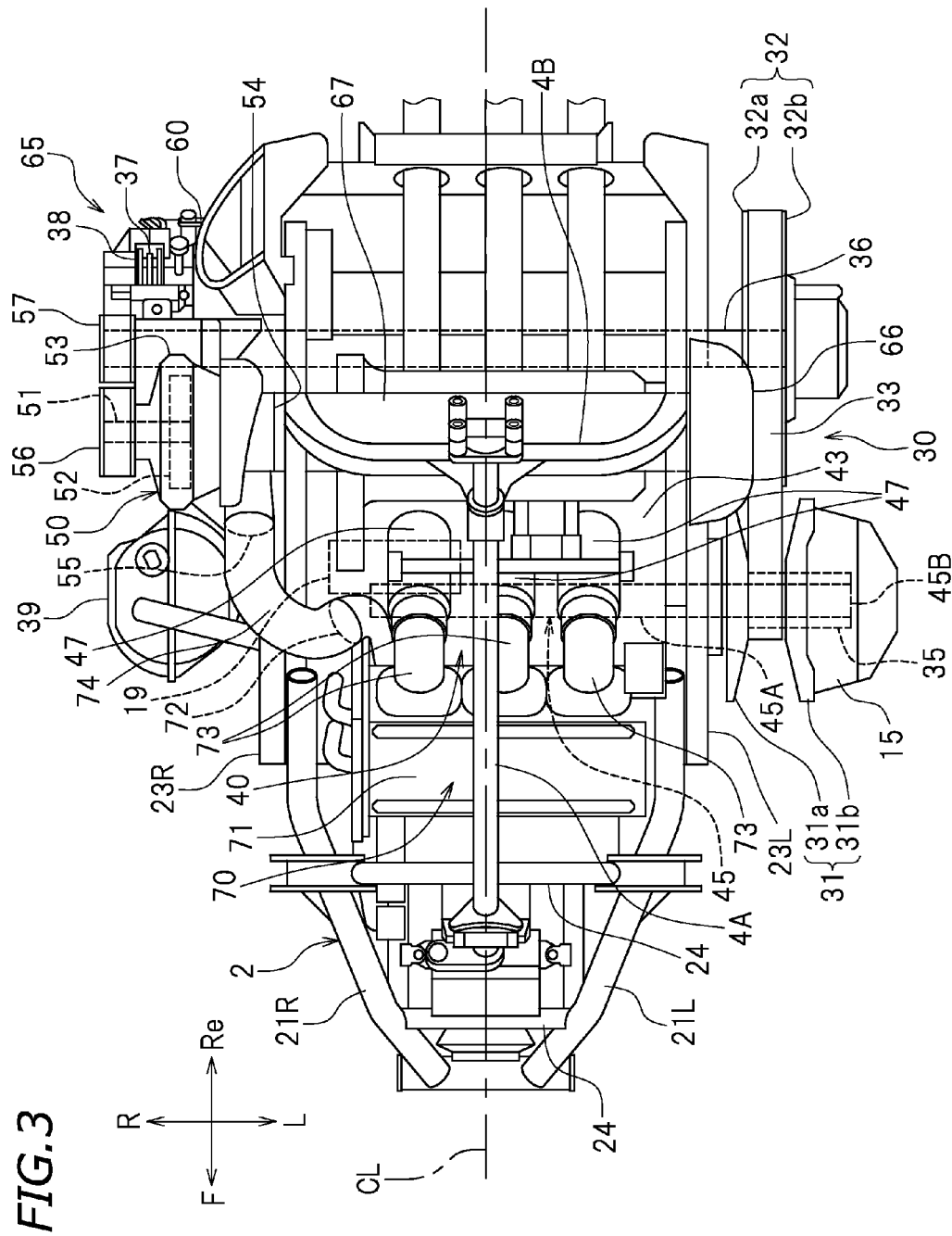
FIG. 3 is a plan view showing the primary section of the snowmobile.

As shown in FIGS. 2 and 3, the snowmobile 1 includes an internal combustion engine (hereinafter referred to as an engine) 40, a centrifugal clutch 15, a belt-type continuously variable transmission (hereinafter referred to as a CVT) 30, which is an example of a transmission, and a supercharger 50 that compresses air and supplies the compressed air to the engine 40. As shown in FIG. 1, the snowmobile 1 includes a driving device 10 driven by the power from the engine 40. The driving device 10 is a device that generates the driving power of the snowmobile 1. In the present preferred embodiment, the driving device 10 includes a driving wheel 11, a driven wheel 12, and a track belt 13 wound around the driving wheel 11 and the driven wheel 12. The snowmobile 1 further includes a starter motor 19 (see FIGS. 3 and 6) that starts the engine 40.

Figure 4:
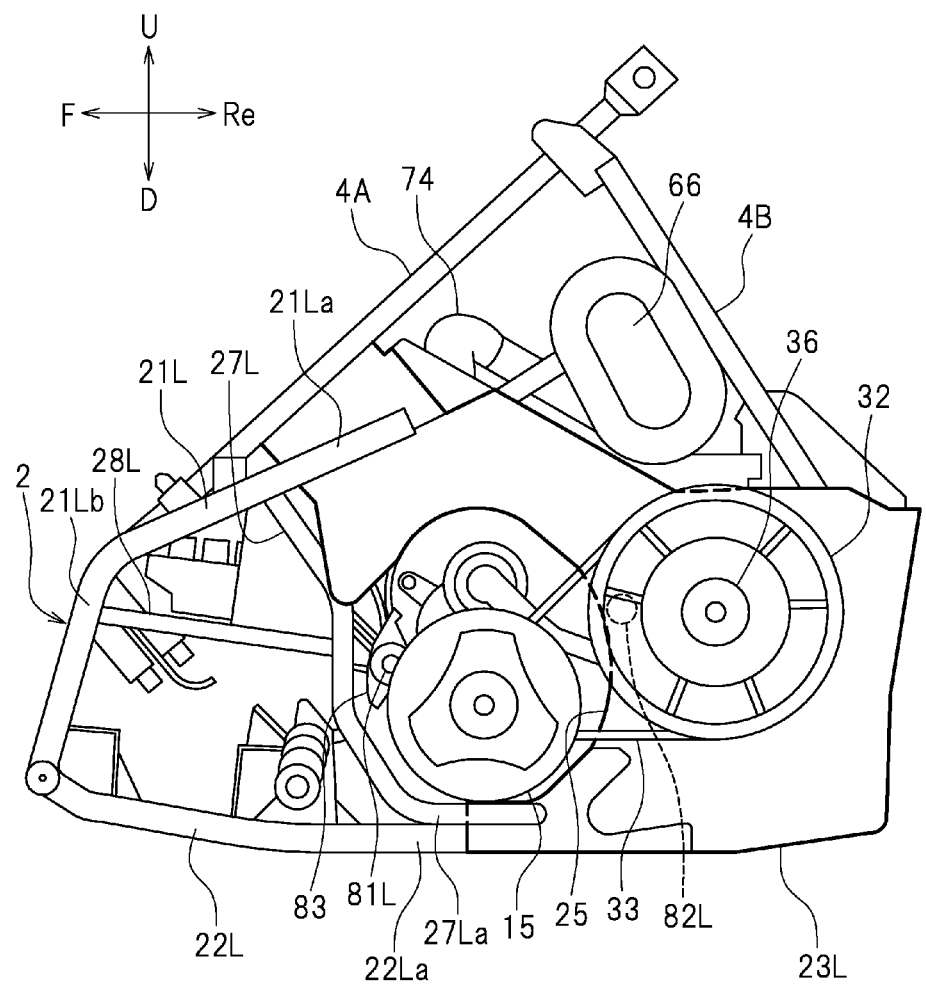
FIG. 4 is a left side view showing the primary section of the snowmobile.
Figure 5:
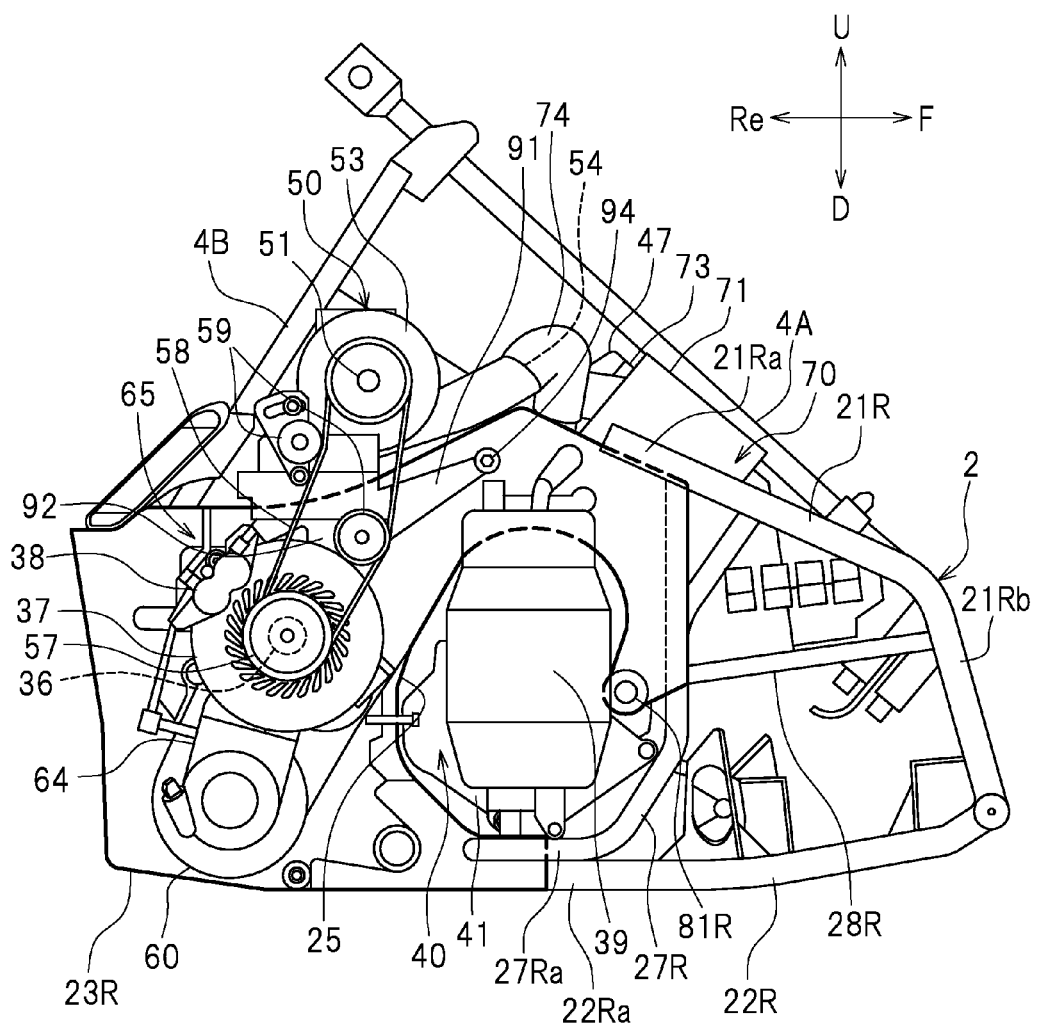
FIG. 5 is a right side view showing the primary section of the snowmobile.
Figure 6:
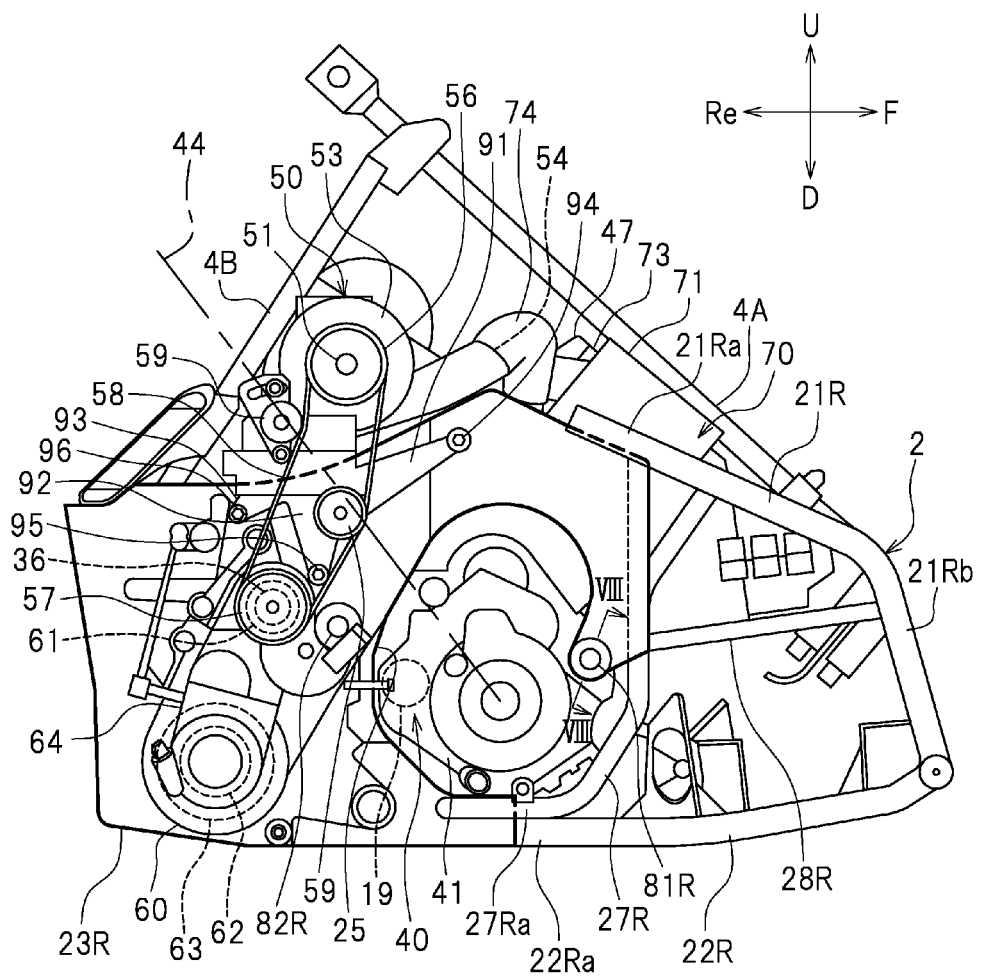
FIG. 6 is a right side view showing the primary section of the snowmobile.

FIG. 4 is a left side view showing a primary section of the snowmobile 1, and FIG. 5 is a right side view showing the primary section. Note, however, that a belt 58 to be described below is not shown in FIG. 5. FIG. 6 is a view similar to FIG. 5, with a brake device 65 and an oil tank 39 to be described below removed. As shown in FIG. 4, the frame 2 includes a steering frame 4B that rotatably supports the steering shaft 4A. The steering shaft 4A extends diagonally toward the lower front side. The steering frame 4B extends diagonally toward the lower rear side as the vehicle is seen from the side. As shown in FIG. 3, the steering frame 4B extends in the vehicle width direction as the vehicle is seen from above. Note that the vehicle width direction refers to the left-right direction.

As shown in FIG. 4, the frame 2 includes an upper left frame 21L, a lower left frame 22L, and a left side frame 23L. As shown in FIG. 5, the frame 2 includes an upper right frame 21R, a lower right frame 22R, and a right side frame 23R.

The upper left frame 21L, the lower left frame 22L, the upper right frame 21R, and the lower right frame 22R are preferably pipe-shaped members. As shown in FIG. 3, the upper left frame 21L and the upper right frame 21R are spaced apart from each other in the vehicle width direction. As shown in FIGS. 4 and 5, the upper left frame 21L and the upper right frame 21R preferably have a bent shape as the vehicle is seen from the side. As shown in FIG. 3, the upper left frame 21L and the upper right frame 21R preferably have a bent shape as the vehicle is seen from above. As the vehicle is seen from above, a front portion of the upper left frame 21L and a front portion of the upper right frame 21R are inclined with respect to the vehicle center line CL so that the interval or space therebetween decreases in the forward direction. A rear portion of the upper left frame 21L and a rear portion of the upper right frame 21R extend in the vehicle front-rear direction.

The lower left frame 22L is located under the upper left frame 21L, and the lower right frame 22R is located under the upper right frame 21R. As the vehicle is seen from above, the lower left frame 22L and the lower right frame 22R preferably have a bent shape similar to that of the upper left frame 21L and the upper right frame 21R. As shown in FIG. 4, the upper left frame 21L extends diagonally in an upper rear direction from the front end portion of the lower left frame 22L as the vehicle is seen from the side. An intermediate portion of the upper left frame 21L preferably has a bent shape. As shown in FIG. 5, the upper right frame 21R extends diagonally in an upper rear direction from the front end portion of the lower right frame 22R as the vehicle is seen from the side. An intermediate portion of the upper right frame 21R preferably has a bent shape.

As shown in FIG. 3, a plurality of transverse frames 24 extending in the vehicle width direction bridge the upper left frame 21L and the upper right frame 21R. The upper left frame 21L and the upper right frame 21R are connected together by the transverse frames 24. Although not shown in the figures, the lower left frame 22L and the lower right frame 22R are connected together by a plurality of transverse frames extending in the vehicle width direction.

As shown in FIGS. 4 and 5, the left side frame 23L and the right side frame 23R are preferably plate-shaped members. The left side frame 23L and the right side frame 23R extend in the vehicle front-rear direction and in the vertical direction. Note that the vertical direction refers to the vehicle up-down direction. As shown in FIG. 3, the left side frame 23L and the right side frame 23R are spaced apart from each other in the vehicle width direction. The left side frame 23L and the right side frame 23R are connected together by a plurality of transverse frames extending in the vehicle width direction. As shown in FIGS. 4 and 5, a recessed portion 25 recessed toward the rear side is provided in the front portion of the left side frame 23L and in the front portion of the right side frame 23R. As shown in FIG. 3, the left side frame 23L is located between a portion of the engine 40, excluding an outer crankshaft 45B to be described below, and the CVT 30, as the vehicle is seen from above. The right side frame 23R is located between the engine 40 and the supercharger 50 as the vehicle is seen from above.

As shown in FIG. 4, the upper left frame 21L and the lower left frame 22L are connected to the left side frame 23L. While a rear portion 21La of the upper left frame 21L is connected to the left side frame 23L and a rear portion 22La of the lower left frame 22L is connected to the left side frame 23L in the present preferred embodiment, there is no particular limitation on how they are connected together. The upper end portion of a left vertical frame 27L is connected to the rear portion 21La of the upper left frame 21L. The vertical frame 27L preferably has a bent shape. A lower end portion 27La of the vertical frame 27L is connected to the left side frame 23L. The lower end portion 27La of the vertical frame 27L is located above the rear portion 22La of the lower left frame 22L. A front portion 21Lb of the upper left frame 21L and the vertical frame 27L are connected together via a middle frame 28L extending in the vehicle front-rear direction as the vehicle is seen from the side. The front end portion of the middle frame 28L is connected to the front portion 21Lb of the upper left frame 21L, and the rear end portion of the middle frame 28L is connected to the vertical frame 27L.

As shown in FIG. 5, the upper right frame 21R and the lower right frame 22R are connected to the right side frame 23R. While a rear portion 21Ra of the upper right frame 21R is connected to the right side frame 23R and a rear portion 22Ra of the lower right frame 22R is connected to the right side frame 23R in the present preferred embodiment, there is no particular limitation on how they are connected together. The upper end portion of a right vertical frame 27R is connected to the rear portion 21Ra of the upper right frame 21R. The vertical frame 27R preferably has a bent shape. A lower end portion 27Ra of the vertical frame 27R is connected to the right side frame 23R. The lower end portion 27Ra of the vertical frame 27R is located above the rear portion 22Ra of the lower right frame 22R. A front portion 21Rb of the upper right frame 21R and the vertical frame 27R are connected together via a middle frame 28R extending in the vehicle front-rear direction as the vehicle is seen from the side. The front end portion of the middle frame 28R is connected to the front portion 21Rb of the upper right frame 21R, and the rear end portion of the middle frame 28R is connected to the vertical frame 27R.

Figure 7:
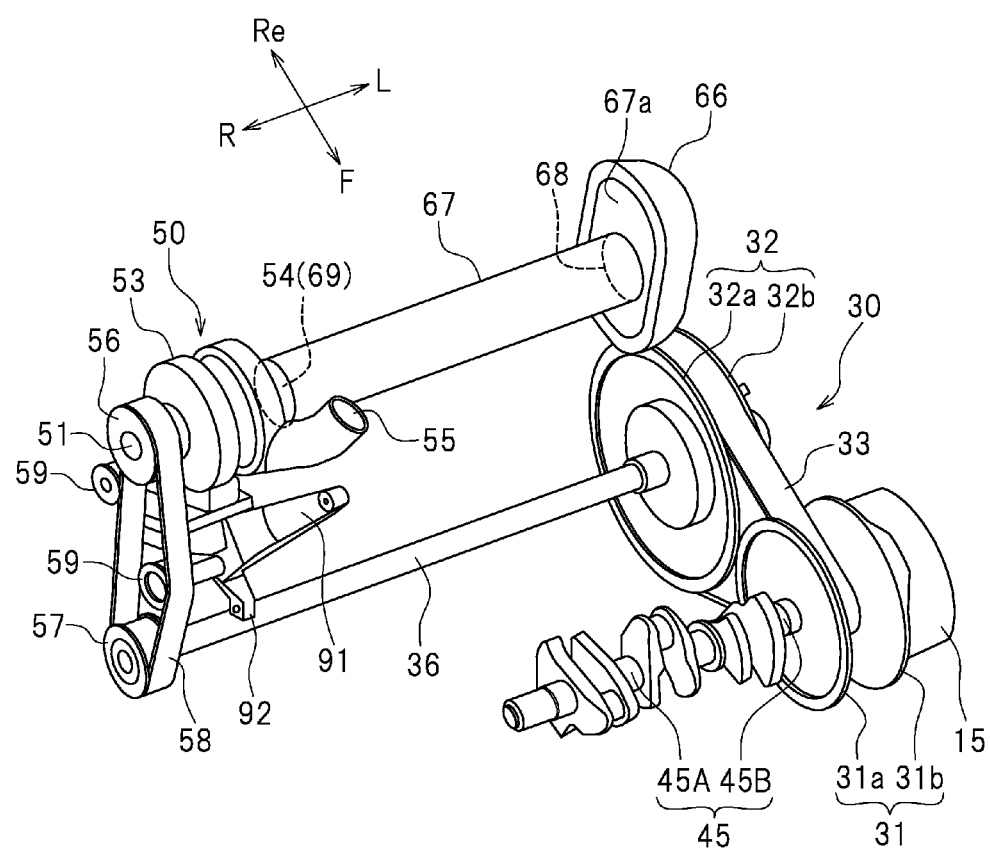
FIG. 7 is a perspective view showing a driving force transmission path, a supercharger, and a duct of the snowmobile.

Next, the engine 40 will be described. While there is no particular limitation on the type of the engine 40, the engine 40 of the present preferred embodiment is preferably a three-cylinder internal combustion engine, for example, including three cylinders arranged next to one another in the vehicle width direction. As shown in FIG. 3, the engine 40, excluding the outer crankshaft 45B to be described below, is located between the left side frame 23L and the right side frame 23R. The engine 40 includes a crankcase 41 (see FIG. 6), a cylinder block (not shown) connected to the crankcase 41, and a cylinder head 43 (see FIG. 3) connected to the cylinder block. In the present preferred embodiment, as shown in FIG. 6, a cylinder axis 44 of the engine 40 is inclined with respect to the horizontal line and the vertical line as the vehicle is seen from the side. Specifically, the cylinder axis 44 is inclined diagonally in an upper rear direction as the vehicle is seen from the side. Although not shown in the figures, the cylinder block extends diagonally in an upper rear direction from the crankcase 41, and the cylinder axis 44 is inclined upward toward the rear side. As shown in FIGS. 3 and 7, the engine 40 includes a crankshaft 45 extending in the vehicle width direction. A combustion chamber (not shown) is provided inside the cylinder head 43 and the cylinder block, and a fuel is combusted in the combustion chamber to rotate the crankshaft 45. Although not shown in the figures, the crankshaft 45 is linked to the starter motor 19 via a gear (not shown). The crankshaft 45 includes an inner crankshaft 45A located inside the crankcase 41, and the outer crankshaft 45B located outside the crankcase 41. The outer crankshaft 45B extends leftward from the crankcase 41. Hereinbelow, "inside" in the vehicle width direction refers to a direction of moving toward the vehicle center line CL, whereas "outside" in the vehicle width direction refers to a direction of moving away from the vehicle center line CL. The outer crankshaft 45B extends outward in the vehicle width direction from the crankcase 41. In the present preferred embodiment, the inner crankshaft 45A and the outer crankshaft 45B preferably are integral and made of a single member. Note, however, that the inner crankshaft 45A and the outer crankshaft 45B may be separate members.

The engine 40 is supported on the frame 2. Specifically, the engine 40 is supported on the left side frame 23L and the right side frame 23R. Next, the structure supporting the engine 40 will be described.

As shown in FIG. 6, a hole 81R is provided in the front portion of the right side frame 23R. A hole 82R is provided in the central portion of the right side frame 23R. The hole 82R is located rearward of the hole 81R. The hole 81R and the hole 82R are configured to receive fasteners, such as bolts to fix the engine 40 on the right side frame 23R, therein. As shown in FIG. 4, a bracket 83 with a hole 81L therein is provided in the front portion of the left side frame 23L. A hole 82L is provided in the central portion of the left side frame 23L. The hole 82L is located rearward of the hole 81L. The hole 81L and the hole 82L are configured to receive fasteners, such as bolts to fix the engine 40 on the left side frame 23L, therein.

Figure 8:
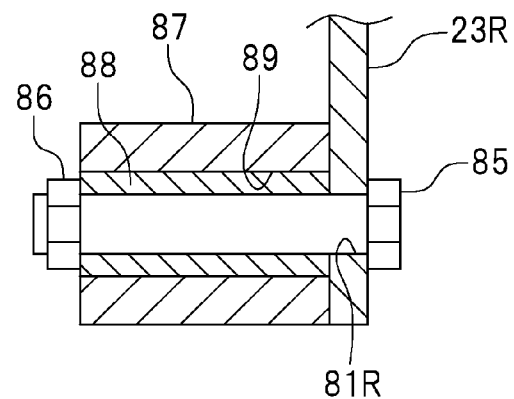
FIG. 8 is a cross-sectional view taken along line VIII of FIG. 6.

FIG. 8 is a view schematically representing the cross section along line VIII of FIG. 6. As shown in FIG. 8, the engine 40 includes a mount boss 87 with a through hole 89 extending therethrough. The mount boss 87 is positioned with respect to the right side frame 23R so that the hole 81R of the right side frame 23R and the through hole 89 are aligned together. A tubular bush 88 is inserted inside the through hole 89 of the mount boss 87, and a bolt 85 is inserted through the hole 81R of the right side frame 23R and the bush 88. The bolt 85 extends in the vehicle width direction. The bolt 85 extends through the right side frame 23R, the mount boss 87, and the bush 88, with a nut 86 tightened on the distal portion of the bolt 85. With the bolt 85 and the nut 86, the mount boss 87 is supported on the right side frame 23R. The bush 88 is preferably made of an elastic material, and the bush 88 is preferably made by a rubber in the present preferred embodiment. With the rubber bush 88 interposed between the mount boss 87 and the bolt 85, the mount boss 87 is allowed to rotate relative to the bolt 85. Thus, the mount boss 87 rotates relative to the right side frame 23R. The engine 40 is supported on the right side frame 23R so as to be movable relative to the right side frame 23R.

Although not shown in the figures, the bolts 85 are similarly inserted through the hole 82R of the right side frame 23R and the hole 81L and the hole 82L of the left side frame 23L so that the engine 40 is supported on the right side frame 23R and the left side frame 23L by the bolts 85 so as to be movable relative to the right side frame 23R and the left side frame 23L. The support structures that support the engine 40 of the hole 82R, the hole 81L, and the hole 82L are similar to that of the hole 81R (see FIG. 8), and will not therefore be described below. Note that the support structures for supporting the engine 40 of the hole 82R, the hole 81L, and the hole 82L may be different from that of the hole 81R. The support structure described above is merely illustrative. Any other suitable structure may be used to support the engine 40 on the right side frame 23R and the left side frame 23L so that the engine 40 is movable relative to the right side frame 23R and the left side frame 23L. In the present preferred embodiment, the engine 40 includes a first left side portion located beside the hole 81L, a second left side portion located beside the hole 82L, a first right side portion located beside the hole 81R, and a second right side portion located beside the hole 82R, and is supported on the frame 2 via the first left side portion, the second left side portion, the first right side portion, and the second right side portion. However, the engine 40 may be supported on the frame 2 via other portions. The number of portions via which the engine 40 is supported is not limited to four.

As shown in FIG. 3, the CVT 30 is located leftward of the engine 40. As shown in FIGS. 3 and 7, the CVT 30 includes a first driving pulley 31, a first driven pulley 32, and a belt 33 wound around the first driving pulley 31 and the first driven pulley 32. The first driven pulley 32 is located rearward of the first driving pulley 31. The first driving pulley 31 includes a pair of right and left drive sheaves 31a and 31b that move toward and away from each other, and the first driven pulley 32 includes a pair of right and left driven sheaves 32a and 32b that move toward and away from each other. A portion of the belt 33 is sandwiched between the right drive sheave 31a and the left drive sheave 31b, and another portion of the belt 33 is sandwiched between the right driven sheave 32a and the left driven sheave 32b. The transmission ratio is changed through continuous changes of the interval or gap between the right drive sheave 31a and the left drive sheave 31b and the interval or gap between the right driven sheave 32a and the left driven sheave 32b.

An input shaft 35 is attached to the center of the first driving pulley 31. The first driving pulley 31 is configured to rotate with the input shaft 35. An output shaft 36 is attached to the center of the first driven pulley 32. The first driven pulley 32 is configured to rotate with the output shaft 36. The input shaft 35 and the output shaft 36 both extend in the vehicle width direction.

The centrifugal clutch 15 is located between the crankshaft 45 and the input shaft 35. Note that the position of the centrifugal clutch 15 as used herein refers not to its spatial position but to its position along the transmission path to receive power from the crankshaft 45. Where "upstream" and "downstream" refer to the driving side and the driven side, respectively, along the power transmission path, the centrifugal clutch 15 is located downstream of the crankshaft 45 and upstream of the input shaft 35. Although not shown in the figures, the centrifugal clutch 15 includes a drive portion connected to the outer crankshaft 45B, and a driven portion connected to the input shaft 35. The drive portion of the centrifugal clutch 15 rotates with the crankshaft 45. If the rotational speed of the drive portion is less than a predetermined speed, the drive portion and the driven portion are disconnected from each other. Therefore, if the rotational speed of the drive portion is less than the predetermined speed, the crankshaft 45 and the input shaft 35 are disconnected from each other. On the other hand, if the rotational speed of the drive portion is greater than or equal to the predetermined speed, the drive portion and the driven portion are linked together. Therefore, if the rotational speed of the drive portion is greater than or equal to the predetermined speed, the crankshaft 45 and the input shaft 35 are linked together. Note that the centrifugal clutch 15 is spatially located leftward of the first driving pulley 31. The centrifugal clutch 15 is located on the outer side of the first driving pulley 31 in the vehicle width direction.

The output shaft 36 extends from the left side of the engine 40 toward the right side of the engine 40. Where "first side" and "second side" refer to the left side and the right side, respectively, in the vehicle width direction, the output shaft 36 extends from the first side toward the second side of the engine 40 in the vehicle width direction. The left end portion of the output shaft 36 is connected to the first driven pulley 32. The power from the crankshaft 45 is transmitted to the output shaft 36 via the CVT 30. The power from the crankshaft 45 is transmitted to the output shaft 36 after undergoing a speed conversion through the CVT 30. The power from the crankshaft 45 is transmitted to the output shaft 36 after being decelerated through the CVT 30. Since the rotational speed of the first driven pulley 32 is smaller than the rotational speed of the first driving pulley 31, the rotational speed of the output shaft 36 is smaller than the rotational speed of the input shaft 35. The rotational speed of the output shaft 36 is smaller than the rotational speed of the crankshaft 45.

As shown in FIG. 6, a gearbox 60 is provided rightward of the engine 40. The gearbox 60 is located rightward of the right side frame 23R. An output shaft gear 61 fixed on the output shaft 36 and a drive shaft gear 63 fixed on a drive shaft 62 of the driving device 10 are accommodated inside the gearbox 60. The driving wheel 11 (see FIG. 1) is fixed on the drive shaft 62. A switching device 64 is also provided in the gearbox 60, which links together the output shaft gear 61 and the drive shaft gear 63 so that the drive shaft gear 63 rotates by receiving the power from the output shaft gear 61, and which switches the direction of rotation of the drive shaft gear 63. As the output shaft 36 rotates, the power from the output shaft 36 is transmitted to the drive shaft 62 via the output shaft gear 61 and the drive shaft gear 63, thus rotating the drive shaft 62. This in turn rotates the driving wheel 11, and moves the track belt 13. In FIG. 1, the counterclockwise rotation of the driving wheel 11 moves the track belt 13 counterclockwise, thus generating a forward driving power for the snowmobile 1. If the switching device 64 switches the direction of rotation of the drive shaft 62 so that the driving wheel 11 rotates clockwise in FIG. 1, the track belt 13 moves clockwise, thus generating a backward driving power for the snowmobile 1. Thus, the switching device 64 switches between the forward moving mode in which a forward driving power is generated and the backward moving mode in which a backward driving power is generated. Note that the gearbox 60 and the switching device 64 may each include any known mechanism. Therefore, the gearbox 60 and the switching device 64 will not be further described in detail.

As shown in FIG. 5, the brake device 65 is located on the outer side of the gearbox 60 in the vehicle width direction. The brake device 65 includes a brake disc 37 linked to the output shaft 36, and a brake caliper 38. The output shaft 36 is fixed to the central portion of the brake disc 37. The brake caliper 38 is configured so that the brake disc 37 is sandwiched therein when braking. The brake disc 37 and the brake caliper 38 are located rightward of the right side frame 23R. The brake disc 37 and the brake caliper 38 are located rightward of the gearbox 60.

Next, the supercharger 50 will be described. As shown in FIG. 3, the supercharger 50 is located rightward of the engine 40. The supercharger 50 is preferably located rightward of the right side frame 23R. The supercharger 50 is located on the opposite side from the CVT 30 with respect to the engine 40. That is, in the vehicle width direction, the engine 40 is located between the CVT 30 and the supercharger 50. Where "first side" and "second side" refer to the left side and the right side, respectively, in the vehicle width direction, the CVT 30 is located on the first side of the engine 40 in the vehicle width direction, and the supercharger 50 is located on the second side of the engine 40 in the vehicle width direction.

As shown in FIG. 6, the supercharger 50 is located above the engine 40 as the vehicle is seen from the side. The supercharger 50 is located above the crankcase 41 of the engine 40 as the vehicle is seen from the side. The supercharger 50 is located above the output shaft 36. The supercharger 50 is preferably located above the brake disc 37. As shown in FIG. 5, the supercharger 50 is located above the right side frame 23R as the vehicle is seen from the side. At least a portion of the supercharger 50 is located in an area surrounded by the steering shaft 4A, the steering frame 4B, and the right side frame 23R as the vehicle is seen from the side. A rotation shaft 51 of the supercharger 50 is located in an area surrounded by the steering shaft 4A, the steering frame 4B, and the right side frame 23R as the vehicle is seen from the side. In the present preferred embodiment, the entire supercharger 50 is located in an area surrounded by the steering shaft 4A, the steering frame 4B, and the right side frame 23R as the vehicle is seen from the side.

The supercharger 50 is a mechanical supercharger using the power from the engine 40 as its power source. The supercharger 50 operates by receiving the power from the crankshaft 45 of the engine 40. The supercharger 50 is connected indirectly to the crankshaft 45, details of which will be described below. While the supercharger 50 is of a centrifugal type in the present preferred embodiment, there is no particular limitation on the type of the supercharger 50. The supercharger 50 includes the rotation shaft 51, an impeller 52 (see FIG. 3) fixed on the rotation shaft 51, and a casing 53 accommodating the impeller 52 therein. The casing 53 is provided with a suction port 54 to take in air, and a discharge port 55 to discharge air. The suction port 54 includes an opening facing leftward. Where "first side" refers to the left side in the vehicle width direction, the suction port 54 includes an opening facing toward the first side in the vehicle width direction. The discharge port 55 including an opening facing forward.

As shown in FIG. 7, a duct 67 is connected to the suction port 54. The duct 67 is a tubular member that allows passage of air therethrough. The duct 67 extends in the left-right direction. An inlet 68 through which air flows in is provided at the left end of the duct 67, and an outlet 69 through which air flows out is provided at the right end of the duct 67. The right end portion of the duct 67 is inserted in the suction port 54 of the casing 53 of the supercharger 50, with the outlet 69 of the duct 67 connected to the suction port 54 of the casing 53. A flange portion 67a is provided at the left end portion of the duct 67. A filter 66 is attached to the flange portion 67a. The inlet 68 of the duct 67 is covered by the filter 66. When the supercharger 50 is operative, outside air is taken into the duct 67 through the filter 66, and taken into the casing 53 of the supercharger 50 through the duct 67. Air, which has been taken into the casing 53 of the supercharger 50, is compressed and discharged through the discharge port 55.

As shown in FIG. 6, a second driven pulley 56 is fixed on the rotation shaft 51 of the supercharger 50. The second driven pulley 56 is located on the outer side of the casing 53 in the vehicle width direction. The second driven pulley 56 is located rightward of the casing 53. A second driving pulley 57 is fixed on the output shaft 36. The second driving pulley 57 is located rightward of the right side frame 23R. The second driving pulley 57 is located on the outer side of the gearbox 60 in the vehicle width direction. The second driving pulley 57 is located on the outer side of the brake device 65 in the vehicle width direction. The second driving pulley 57 is located rightward of the gearbox 60 and is located rightward of the brake device 65. The belt 58, which is an example of the power transmission member, is wound around the second driving pulley 57 fixed on the output shaft 36 and the second driven pulley 56 fixed on the rotation shaft 51. Note that reference numeral 59 refers to a tensioner that tensions the belt 58. The output shaft 36 and the rotation shaft 51 are linked together so that power is transmitted therebetween via the second driving pulley 57, the belt 58, and the second driven pulley 56. Thus, the power from the output shaft 36 is transmitted to the rotation shaft 51. The supercharger 50 is driven by the power from the output shaft 36. The rotation shaft 51 of the supercharger 50 is linked to the crankshaft 45 of the engine 40 via the input shaft 35, the CVT 30, the output shaft 36, the second driving pulley 57, the belt 58, and the second driven pulley 56.

As shown in FIG. 3, the rotation shaft 51 is located rearward of the crankshaft 45. The rotation shaft 51 is located forward of the output shaft 36. The rotation shaft 51 is preferably located between the crankshaft 45 and the output shaft 36 as the vehicle is seen from above. As shown in FIG. 6, the rotation shaft 51 is located above the output shaft 36. The rotation shaft 51 is located above the crankshaft 45.

The supercharger 50 is fixed on the frame 2. The supercharger 50 is not attached to the engine 40 and is preferably not supported on the engine 40. As shown in FIG. 6, the casing 53 of the supercharger 50 is provided with a first arm 91 extending forward, a second arm 92 extending downward, and a third arm 93 extending rearward. The distal portion of the first arm 91, the distal portion of the second arm 92, and the distal portion of the third arm 93 each include a hole therein. A bolt 94 is inserted through the hole of the first arm 91. The first arm 91 is fixed on the right side frame 23R by the bolt 94. A bolt 95 is inserted through the hole of the second arm 92. The second arm 92 is fixed on the right side frame 23R by the bolt 95. A bolt 96 is inserted through the hole of the third arm 93. The third arm 93 is fixed on the right side frame 23R by the bolt 96. Since the engine 40 is supported on the frame 2 via an elastic material therebetween as described above, the engine 40 is movable relative to the frame 2. On the other hand, the supercharger 50 is fixed on the frame 2 so as to be immovable relative to the frame 2. Thus, the supercharger 50 is movable relative to the engine 40.

Figure 9:
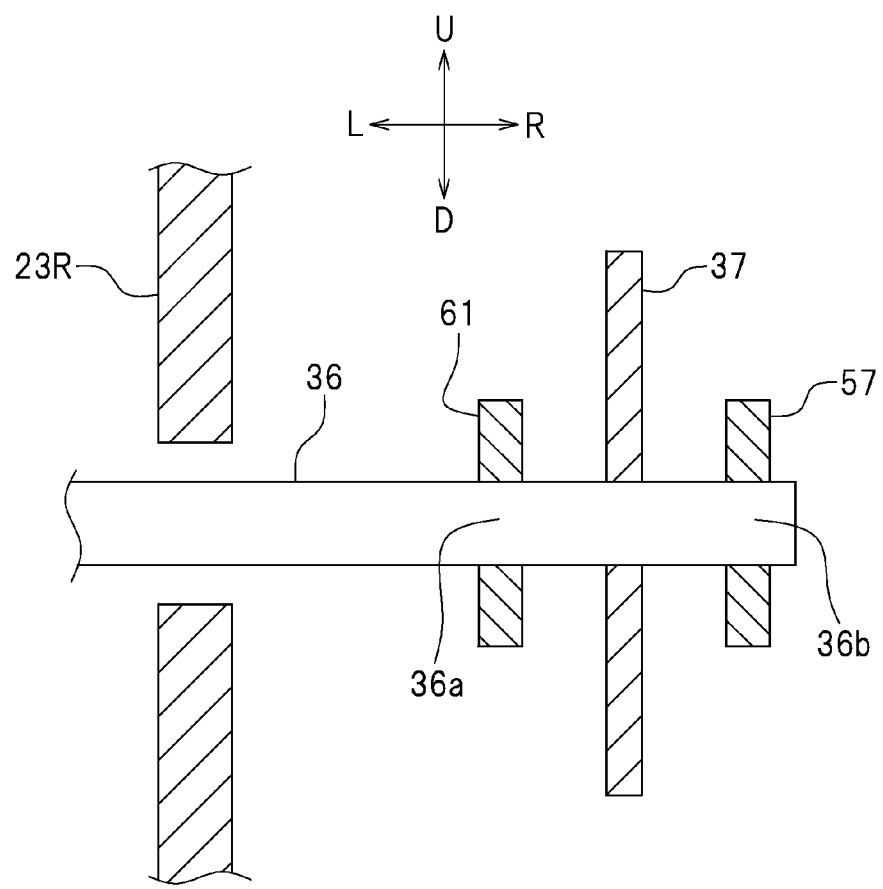
FIG. 9 is a conceptual diagram showing a positional relationship between an output shaft gear, a brake disc, and a driving pulley.

As described above, the output shaft gear 61, the brake disc 37, and the second driving pulley 57 are fixed on the output shaft 36. FIG. 9 is a conceptual diagram showing a positional relationship between the output shaft gear 61, the brake disc 37, and the second driving pulley 57. The output shaft gear 61, the brake disc 37, and the second driving pulley 57 are located, outside the right side frame 23R in the vehicle width direction, in this order, from the inner side toward the outer side in the vehicle width direction. That is, the output shaft gear 61 is located on the outer side of the right side frame 23R in the vehicle width direction, the brake disc 37 is located on the outer side of the output shaft gear 61 in the vehicle width direction, and the second driving pulley 57 is located on the outer side of the brake disc 37 in the vehicle width direction. The output shaft gear 61 is located rightward of the right side frame 23R, the brake disc 37 is located rightward of the output shaft gear 61, and the second driving pulley 57 is located rightward of the brake disc 37.

The output shaft 36 is linked to the driving device 10 via the output shaft gear 61. A portion of the output shaft 36 where the output shaft gear 61 is fixed is a driving device link portion 36a linked to the driving device 10. The power from the output shaft 36 is output toward the driving device 10 from the driving device link portion 36a. The output shaft 36 is also linked to the rotation shaft 51 of the supercharger 50 via the second driving pulley 57, the belt 58, and the second driven pulley 56. A portion of the output shaft 36 where the second driving pulley 57 is fixed is a supercharger link portion 36b linked to the rotation shaft 51 of the supercharger 50. The power from the output shaft 36 is output toward the supercharger 50 from the supercharger link portion 36b. The supercharger link portion 36b is provided in the distal portion of the output shaft 36. The supercharger link portion 36b is provided at the right end portion of the output shaft 36. The driving device link portion 36a is located on the inner side of the supercharger link portion 36b in the vehicle width direction. The driving device link portion 36a is located leftward of the supercharger link portion 36b. The driving device link portion 36a is located between the supercharger link portion 36b along the output shaft 36 and the CVT 30.

As shown in FIG. 3, the snowmobile 1 includes an intercooler 70 that cools compressed air from the supercharger 50. The intercooler 70 is located between the left side frame 23L and the right side frame 23R as the vehicle is seen from above. The intercooler 70 is preferably located rightward of the CVT 30 and leftward of the supercharger 50. The intercooler 70 is preferably located forward of the output shaft 36 as the vehicle is seen from above. The intercooler 70 is preferably located forward of the supercharger 50. As shown in FIG. 6, the intercooler 70 is preferably located above the crankcase 41 of the engine 40 as the vehicle is seen from the side. The intercooler 70 is preferably located forward of the cylinder block and the cylinder head 43. Note, however, that the location of the intercooler 70 is merely illustrative, and there is no particular limitation on the location of the intercooler 70.

The intercooler 70 includes a box-shaped casing 71, an air filter (not shown) inside the casing 71, a cooler (not shown) inside the casing 71, a suction port 72 that takes air into the casing 71, and a discharge tube 73 that discharges air out of the casing 71. The suction port 72 is located rightward of the vehicle center line CL. That is, the suction port 72 is located on the same side as the supercharger 50 with respect to the vehicle center line CL. The discharge port 55 of the supercharger 50 and the suction port 72 are connected together via a rubber tube (hereinafter referred to as a rubber tube) 74 therebetween. The rubber tube 74 is an example of a flexible tube. One end of the rubber tube 74 is connected to the discharge port 55, and the other end of the rubber tube 74 is connected to the suction port 72. At least a portion of the discharge port 55 of the supercharger 50 is located rightward of the right side frame 23R, and the suction port 72 is located leftward of the right side frame 23R. The rubber tube 74 extends from the right side to the left side of the right side frame 23R as the vehicle is seen from above.

The engine 40 includes an intake pipe 47 that guides air into the combustion chamber. The discharge tube 73 of the intercooler 70 is connected to the intake pipe 47 of the engine 40. The engine 40 is preferably a three-cylinder engine, for example, and includes three discharge tubes 73 and three intake pipes 47. As shown in FIG. 3, the discharge tubes 73 are arranged next to one another in the vehicle width direction, and the intake pipes 47 are arranged next to one another in the vehicle width direction. The discharge tubes 73 and the intake pipes 47 extend in the vehicle front-rear direction as the vehicle is seen from above.

Air having been compressed through the supercharger 50 is guided into the casing 71 of the intercooler 70 through the rubber tube 74. Air having been guided into the casing 71 is filtered through the air filter and cooled through the cooler. The cooled, filtered air is discharged from the discharge tubes 73 to be supplied into the intake pipes 47 of the engine 40.

As shown in FIG. 2, an exhaust pipe 48 extends rearward. The three exhaust pipes 48 of the engine 40 are connected to a merge collector pipe 49. A silencer 46 is connected to the merge collector pipe 49. The exhaust pipes 48, the merge collector pipe 49, and a portion of the silencer 46 are located under the seat 3 (see FIG. 1). The exhaust gas from the combustion chamber of the engine 40 is discharged to the outside through the exhaust pipes 48, the merge collector pipe 49, and the silencer 46. With the snowmobile 1 of the present preferred embodiment, the supercharger 50 does not use the exhaust gas from the engine 40. The supercharger 50 is separate from the passageway of the exhaust gas, i.e., from the exhaust pipes 48, the merge collector pipe 49, and the silencer 46.

The oil tank 39 is located rightward of the engine 40. The oil tank 39 is located rightward of the right side frame 23R. As shown in FIG. 3, the supercharger 50 is located rearward of the oil tank 39 as the vehicle is seen from above. As shown in FIG. 5, the oil tank 39 is located forward of the gearbox 60 and the brake device 65 as the vehicle is seen from the side. The supercharger 50 is located above the oil tank 39 as the vehicle is seen from the side.

As described above, the snowmobile 1 of the present preferred embodiment is provided with the supercharger 50, and it is therefore possible to increase the engine power. The supercharger 50 includes the rotation shaft 51 linked to the output shaft 36 so that power is transmitted therebetween, and is driven by the power from the output shaft 36. Therefore, unlike a turbo-type supercharger that utilizes the energy of the exhaust gas from the engine 40, the responsiveness is not lowered in the low- to mid-speed range, and there is no need for an advanced thermal management. Moreover, in the snowmobile 1, the centrifugal clutch 15 is located between the crankshaft 45 and the input shaft 35 of the CVT 30. That is, along the power transmission path, the centrifugal clutch 15 is located upstream of the rotation shaft 51 of the supercharger 50. Therefore, when the rotational speed of the crankshaft 45 is zero or low, the power transmission between the crankshaft 45 and the rotation shaft 51 of the supercharger 50 is disconnected, thus reducing the load on the crankshaft 45. Therefore, the engine 40 is desirably started by the starter motor 19 without having to provide a large starter motor 19. Moreover, the supercharging pressure does not become unnecessarily high at a low speed, thus achieving desirable supercharging pressure characteristics. As described above, with the snowmobile 1 of the present preferred embodiment, it is possible to increase the engine power, to keep the load on the crankshaft 45 at start-up low, and to achieve desirable supercharging pressure characteristics.

In the snowmobile 1, the CVT 30 is provided as a transmission. Therefore, it is possible to continuously vary the transmission ratio. While the super charger 50 is driven by the output shaft 36, the rotational speed of the output shaft 36 changes smoothly during a speed change. This prevents the operation of the supercharger 50 from becoming unstable, thus achieving more desirable supercharging pressure characteristics.

In the snowmobile 1, the supercharger 50 is located on the opposite side from the CVT 30 with respect to the engine 40 as shown in FIG. 3. Thus, the snowmobile 1 has a desirable weight balance.

With the snowmobile 1, the crankshaft 45 extends in the vehicle width direction. Where "first side" and "second side" refer to the left side and the right side, respectively, in the vehicle width direction, the CVT 30 is located on the first side of the engine 40 in the vehicle width direction, and the supercharger 50 is located on the second side, opposite to the first side, of the engine 40 in the vehicle width direction. Thus, the snowmobile 1 has a desirable weight balance in the vehicle width direction.

The output shaft 36 extends from the first side toward the second side of the engine 40 in the vehicle width direction. With the snowmobile 1, on the second side of the engine 40 in the vehicle width direction, the output shaft 36 and the rotation shaft 51 of the supercharger 50 are linked together so that power is transmitted therebetween. Thus, it is possible to simplify the configuration of the power transmission member that links together the output shaft 36 and the rotation shaft 51 of the supercharger 50.

The supercharger 50 includes the suction port 54 including an opening facing toward the first side in the vehicle width direction to take in air. With the snowmobile 1, since the suction port 54 includes an opening facing toward the first side in the vehicle width direction, it is possible to provide extra space on the second side of the supercharger 50 in the vehicle width direction. This extra space is effectively utilized as a space to install other components. In the present preferred embodiment, the extra space is effectively utilized as a space to install the power transmission member (the belt 58) that links together the output shaft 36 and the rotation shaft 51 of the supercharger 50.

As shown in FIG. 7, the snowmobile 1 includes the duct 67 that guides air to the supercharger 50. The duct 67 includes the inlet 68 located on the first side of the engine 40 in the vehicle width direction, and the outlet 69 connected to the suction port 54 of the supercharger 50, and the duct 67 extends from the first side toward the second side in the vehicle width direction. In the snowmobile 1, with the provision of the duct 67, air is taken in from the first side of the engine 40 in the vehicle width direction toward the supercharger 50. The position at which air is taken in is determined by appropriately choosing the shape or the length of the duct 67.

As shown in FIG. 6, the rotation shaft 51 of the supercharger 50 is linked to the output shaft 36 via the belt 58. With the snowmobile 1, the power from the output shaft 36 is desirably transmitted to the rotation shaft 51 of the supercharger 50. Note that the power transmission member that transmits the power from the output shaft 36 to the rotation shaft 51 is not limited to the belt 58, but may be a chain, a gear, or any other suitable member. The power transmission member may include two or more of a belt, a chain, and a gear.

As shown in FIG. 9, the output shaft 36 includes the driving device link portion 36a linked to the driving device 10, and the supercharger link portion 36b linked to the rotation shaft 51 of the supercharger 50. In the snowmobile 1, the supercharger 50 is not located downstream of the driving device 10, along the power transmission path that transmits the power from the crankshaft 45 of the engine 40. With the snowmobile 1, the supercharger 50 operates without being substantially influenced by the operation of the driving device 10. Thus, it is possible to desirably operate the supercharger 50.

The driving device link portion 36a is located between the supercharger link portion 36b along the output shaft 36 and the CVT 30. The supercharger link portion 36b is located closer to the distal end of the output shaft 36 than the driving device link portion 36a. Therefore, the power transmission member that links together the output shaft 36 and the rotation shaft 51 of the supercharger 50 so that power is transmitted therebetween is located closer to the distal end of the output shaft 36.

The driving device 10 includes the switching device 64 (see FIG. 6) that switches between the forward moving mode in which a forward driving power is generated and the backward moving mode in which a backward driving power is generated. The snowmobile 1 not only moves forward but also moves backward through the switching of the switching device 64. As described above, since the supercharger 50 is not located downstream of the driving device 10 along the power transmission path, the direction of rotation of the rotation shaft 51 is not reversed upon switching of the switching device 64. Thus, the supercharger 50 desirably operates whether the snowmobile 1 is moving forward or backward.

While preferred embodiments of the present invention have been described above, the present invention is not limited to the these preferred embodiments, and can be carried out in various other preferred embodiments. Other preferred embodiments will now be described.

In the preferred embodiments described above, the centrifugal clutch 15 is preferably located between the crankshaft 45 and the input shaft 35. However, the centrifugal clutch 15 may be located at any position that is downstream of the crankshaft 45 and upstream of the supercharger 50 along the power transmission path. The centrifugal clutch 15 may be located between the output shaft 36 and the rotation shaft 51 of the supercharger 50.

In the preferred embodiments described above, the discharge port 55 of the supercharger 50 and the suction port 72 of the intercooler 70 are preferably connected together via the rubber tube 74 extending therebetween. However, any other suitable flexible tube may be used instead of the rubber tube 74. For example, the rubber tube 74 may be replaced by an easily-deformable corrugated tube (in other words, a bellows-shaped tube). The rubber tube 74 may be replaced by a non-flexible tube (e.g., a resin tube or a metal tube), with a rubber fitting provided between the tube and the discharge port 55 or between the tube and the suction port 72.

While the transmission preferably is the CVT 30 in the preferred embodiments described above, there is no particular limitation on the type of the transmission. The transmission may be a stepped transmission, or may be a dog clutch transmission, for example.

In the preferred embodiments described above, the CVT 30 is preferably located on the left side of the engine 40 and the supercharger 50 on the right side of the engine 40. However, the CVT 30 may be located on the right side of the engine 40 and the supercharger 50 may be located the left side of the engine 40. In such a case, where "first side" and "second side" refer to the right side and the left side, respectively, in the vehicle width direction, the transmission is located on the first side of the engine 40 in the vehicle width direction, and the supercharger 50 is located on the second side of the engine 40 in the vehicle width direction. Then, the suction port 54 of the supercharger 50 includes an opening facing toward the right side, which is the first side in the vehicle width direction.

While the supercharger 50 is preferably located on the opposite side from the CVT 30 with respect to the engine 40 in the preferred embodiments described above, the supercharger 50 and the CVT 30 may be located on the same side of the engine 40. The supercharger 50 and the CVT 30 may both be located on the left side of the engine 40 or on the right side of the engine 40.

In the preferred embodiments described above, the duct 67, extending from the first side toward the second side in the vehicle width direction, is preferably connected to the suction port 54 of the supercharger 50. The duct 67 extends from the right side toward the left side in the vehicle width direction. However, there is no particular limitation on the length of the duct 67. The inlet 68 of the duct 67 may be located rightward of the right end of the engine 40, but it may be located leftward of the right end of the engine 40. The duct 67 is not limited to a straight shape, but may be bent. Moreover, the duct 67 may be optional, and may be omitted. The filter 66 may be attached to the suction port 54 of the supercharger 50.

Figure 10:
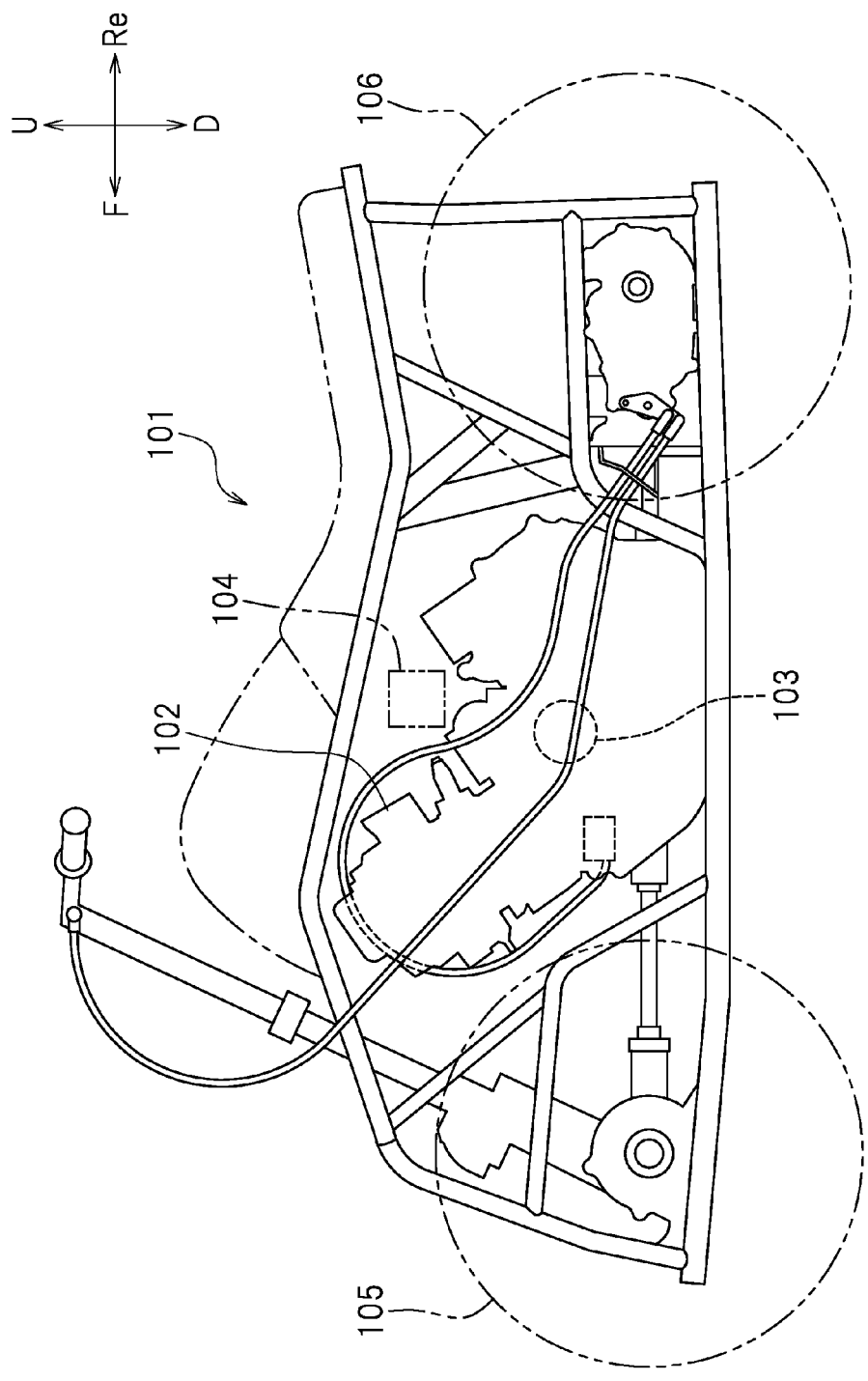
FIG. 10 is a left side view of an ATV according to another preferred embodiment of the present invention.

While the vehicle of the preferred embodiments described above is preferably the snowmobile 1, the vehicle of the present invention is not limited to the snowmobile 1. The vehicle may be any other suitable off-road vehicle. For example, the vehicle may be an ATV (All Terrain Vehicle) 101 as shown in FIG. 10. The ATV 101 is an example straddle-type off-road vehicle. The ATV 101 includes an internal combustion engine 102, a transmission 103, a supercharger 104 and a centrifugal clutch (not shown), and further includes a left front wheel 105, a right front wheel (not shown), a left rear wheel 106 and a right rear wheel (not shown), as part of the driving device.

Figure 11:
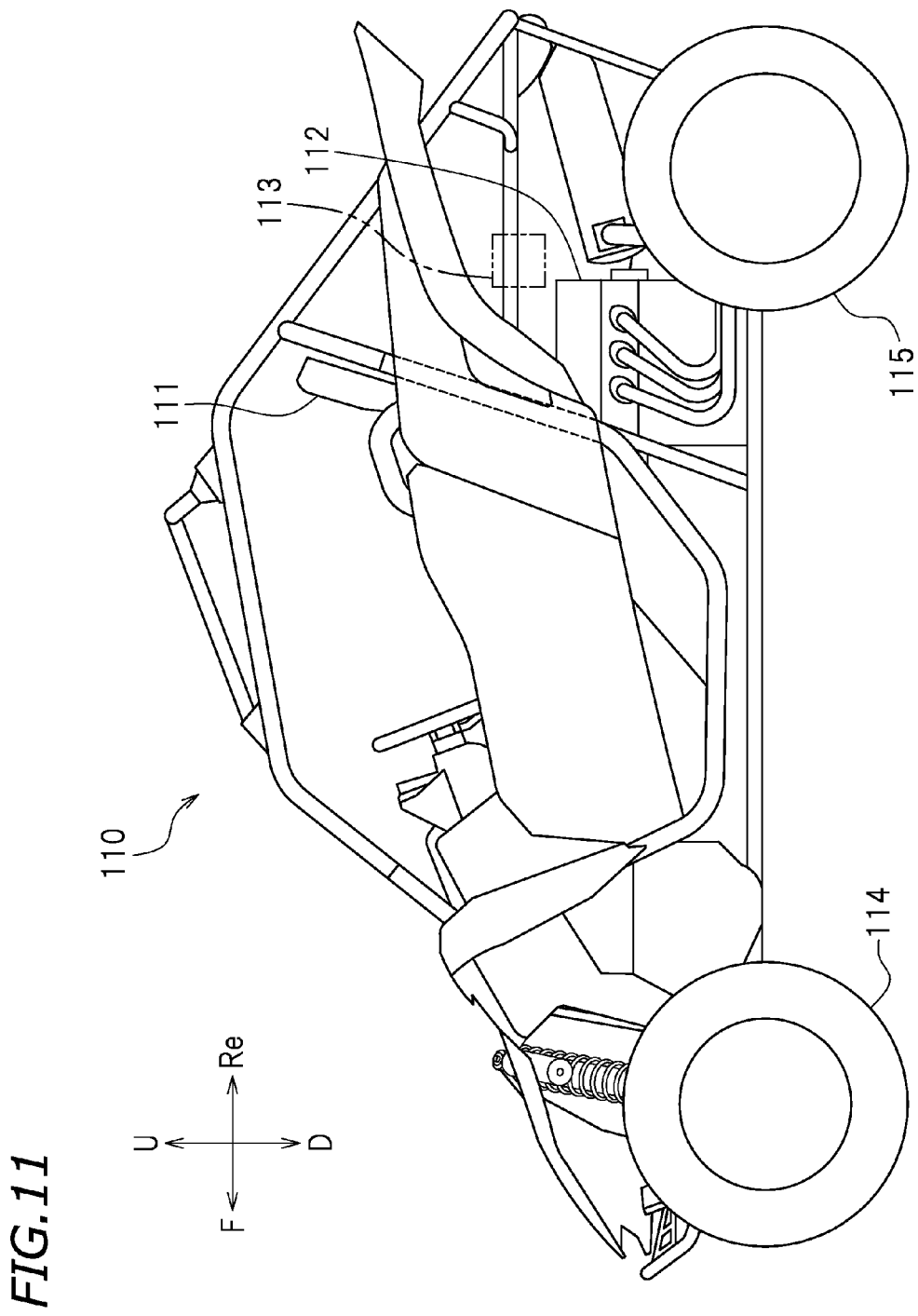
FIG. 11 is a left side view of an ROV according to another preferred embodiment of the present invention.

As shown in FIG. 11, the vehicle may also be an ROV (Recreational Off-highway Vehicle) 110. The ROV 110 is an example off-road vehicle including a plurality of seats 111 arranged next to one another in the vehicle width direction. The ROV 110 includes an internal combustion engine 112, a transmission (not shown), a supercharger 113 and a centrifugal clutch (not shown), and further includes a left front wheel 114, a right front wheel (not shown), a left rear wheel 115 and a right rear wheel (not shown), as part of the driving device.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   an internal combustion engine including a crankshaft;
   a transmission including an input shaft linked to the crankshaft to transmit power therebetween, and an output shaft linked to the input shaft and that rotates at a rotational speed lower than a rotational speed of the input shaft;
   a driving device linked to the output shaft to transmit power therebetween and to generate a driving power;
   a supercharger including a rotation shaft linked to the output shaft to transmit power therebetween, such that the rotation shaft is driven by the output shaft, and to compress air and supply the compressed air to the internal combustion engine; and a centrifugal clutch located between the crankshaft and the input shaft or between the output shaft and the rotation shaft;
   wherein the transmission is a continuously variable transmission or a stepped transmission;
   wherein the output shaft includes a driving device link portion linked to the driving device, and a supercharger link portion linked to the rotation shaft of the supercharger; and
   wherein the driving device link portion is located between the supercharger link portion along the output shaft and the transmission.

2. The vehicle according to claim 1, wherein the continuously variable transmission includes a driving pulley attached to the input shaft, a driven pulley attached to the output shaft, and a belt wound around the driving pulley and the driven pulley.

3. The vehicle according to claim 1, wherein:
   the transmission is located to a side of the internal combustion engine; and
   the supercharger is located on an opposite side of the internal combustion engine from the transmission.

4. The vehicle according to claim 1, wherein:
   the crankshaft extends in a vehicle width direction;
   the transmission is located on a first side of the internal combustion engine in the vehicle width direction; and
   the supercharger is located on a second side, opposite to the first side, of the internal combustion engine in the vehicle width direction.

5. The vehicle according to claim 4, wherein the output shaft extends from the first side toward the second side of the internal combustion engine in the vehicle width direction.

6. The vehicle according to claim 5, wherein the supercharger includes a suction port including an opening that takes in air and faces the first side in the vehicle width direction.

7. The vehicle according to claim 6, further comprising a duct including an inlet located on the first side of the internal combustion engine in the vehicle width direction, and an outlet connected to the suction port of the supercharger, wherein the duct extends from the first side toward the second side in the vehicle width direction.

8. The vehicle according to claim 1, wherein the rotation shaft of the supercharger is linked to the output shaft via at least one of a belt, a chain, and a gear.

9. The vehicle according to claim 1, wherein the driving device includes a switch that switches between a forward moving mode in which a forward driving power is generated and a backward moving mode in which a backward driving power is generated.

10. The vehicle according to claim 1, wherein the vehicle is a snowmobile.

11. The vehicle according to claim 1, wherein the vehicle is an off-road vehicle.

* * * * *